(12) United States Patent
Kedem et al.

(10) Patent No.: US 9,892,005 B2
(45) Date of Patent: *Feb. 13, 2018

(54) SYSTEM AND METHOD FOR OBJECT-BASED CONTINUOUS DATA PROTECTION

(71) Applicants: ZERTO LTD., Herzliya (IL); Tamar Ben-Or, Emek Hefer (IL)

(72) Inventors: Oded Kedem, Tel-Aviv (IL); Tomer Ben-Or, Givat Haim Ihud (IL)

(73) Assignee: ZERTO LTD., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,118

(22) Filed: May 21, 2015

(65) Prior Publication Data

US 2016/0342486 A1 Nov. 24, 2016

(51) Int. Cl.
*G06F 9/00* (2006.01)
*G06F 11/14* (2006.01)
*G06F 17/30* (2006.01)
*G06F 9/455* (2006.01)
*G06F 11/20* (2006.01)

(52) U.S. Cl.
CPC ...... *G06F 11/1471* (2013.01); *G06F 11/1466* (2013.01); *G06F 17/30191* (2013.01); *G06F 17/30575* (2013.01); *G06F 17/30607* (2013.01); *G06F 9/455* (2013.01); *G06F 9/45558* (2013.01); *G06F 11/1456* (2013.01); *G06F 11/2094* (2013.01); *G06F 2009/45562* (2013.01); *G06F 2009/45579* (2013.01)

(58) Field of Classification Search
CPC ............. G06F 11/1466; G06F 11/1469; G06F 2201/855; G06F 17/30191; Y10S 707/99953; Y10S 707/99955
See application file for complete search history.

(56) References Cited

U.S. PATENT DOCUMENTS 6,023,710 A * 2/2000 Steiner .............. G06F 17/30067
7,523,149 B1 * 4/2009 Sridharan ........... G06F 11/1456
(Continued)

OTHER PUBLICATIONS

European Search Report of European Application No. EP 16 17 0559 dated Oct. 27, 2016.

*Primary Examiner* — Augustine K Obisesan
(74) *Attorney, Agent, or Firm* — Pearl Cohen Zedek Latzer Baratz LLP

(57) ABSTRACT

A system and method for protecting data in a protected storage system. A replication of the protected storage system at a predetermined time point is stored in an object-based storage in replicated content objects of a target disk. Information related to a write operation in the protected storage system is obtained, the information including: data stored on the protected storage system and metadata related to the stored data. A journal is maintained by: including a copy of the stored data in a content entry in one or more journal content objects, including at least some of the metadata in a metadata entry in one or more metadata objects, storing the journal content objects and metadata objects in the object-based storage, and associating the metadata entry with the content entry. The data received before a predetermined time window is periodically moved from the journal to the target disk.

19 Claims, 5 Drawing Sheets

(56) References Cited

U.S. PATENT DOCUMENTS

| | | | | |
|---|---|---|---|---|
| 7,689,599 B1* | 3/2010 | Shah | G06F 11/1471 | 707/694 |
| 7,797,358 B1* | 9/2010 | Ahal | G06F 11/1471 | 707/823 |
| 7,971,091 B1* | 6/2011 | Bingham | G06F 11/1446 | 714/6.12 |
| 8,065,442 B1* | 11/2011 | Chatterjee | G06F 11/1471 | 707/648 |
| 8,346,787 B1* | 1/2013 | Vaikar | G06F 17/30144 | 707/693 |
| 8,825,602 B1* | 9/2014 | Desai | G06F 17/30174 | 707/646 |
| 2005/0235016 A1 | 10/2005 | Amano et al. | | |
| 2006/0015574 A1* | 1/2006 | Seed | H04L 67/1095 | 709/219 |
| 2007/0156788 A1* | 7/2007 | Wray | G06F 21/6209 | |
| 2008/0082592 A1 | 4/2008 | Ahal et al. | | |
| 2008/0086483 A1* | 4/2008 | Park | G06F 17/30233 | |
| 2009/0063587 A1* | 3/2009 | Jakob | G06F 11/2094 | |
| 2009/0077557 A1* | 3/2009 | Ichikawa | G06F 11/3485 | 718/102 |
| 2010/0005259 A1* | 1/2010 | Prahlad | G06F 11/1435 | 711/162 |
| 2011/0213994 A1* | 9/2011 | Thereska | G06F 1/3221 | 713/320 |
| 2012/0166403 A1* | 6/2012 | Kim | G06F 17/30156 | 707/692 |
| 2012/0203742 A1 | 8/2012 | Goodman et al. | | |
| 2012/0233418 A1* | 9/2012 | Barton | H04L 67/1095 | 711/162 |
| 2013/0013564 A1 | 1/2013 | Ben-Or et al. | | |
| 2014/0188803 A1* | 7/2014 | James | G06F 17/30174 | 707/638 |
| 2014/0201142 A1 | 7/2014 | Varadharajan et al. | | |
| 2015/0269032 A1* | 9/2015 | Muthyala | G06F 11/1464 | 707/639 |

* cited by examiner

SYSTEM AND METHOD FOR OBJECT-BASED CONTINUOUS DATA PROTECTION

FIELD OF THE INVENTION

The present invention relates generally to continuous data protection. More specifically, the present invention relates to using object-based storage technique, system or architecture for continuous data protection.

BACKGROUND

Data protection systems and methods are known in the art. Generally, data protection systems copy data from a protected storage or system to a backup storage or system. For example, systems that replicate the content of disks to a recovery system or site, e.g., in a different geographic location are known. Data in a recovery site typically includes information related to the protected disks or storage system, e.g., history as known in the art. Historical information enables recovering disk content at any point in time within a specified history.

Replacing a system with a backup system is referred to in the art as fail-over. For example, a user can fail-over a system in an organization (including disks or other storage systems) by initiating a system at a recovery site and be provided with disks' content of the organization's system by the system at the recovery site.

A fail-over can be done for specific point in time. For example, a system (e.g., a disk) at a recovery site can be configured to replace a protected system such that content in the system at a recovery site is same or similar to the content that was stored in the protected system at a specified date or time.

Typical scenarios that will result in failing-over of a protected system may, for example, occur when the protected system is inaccessible, or a planned migration of a protected system from a protected site to a recovery site or recovery system. For instance, suppose that the user protects a system that is, or serves as, a mail exchange server. If a hurricane hits the site that runs the protected system, the user can fail-over the protected system to a recovery site or recovery system with the latest available point in time and enable end users use the failed-over (or recovery) system in the recovery site as their mail exchange server.

Object storage (also known as object-based storage) is known in the art. Object storage techniques or object-based storage systems or architectures are available, e.g., the online storage web service S3 offered by Amazon. Object Storage technique uses a digital data storage architecture or platform that stores and manages data as objects or containers (e.g., buckets in S3). Object Storage is simpler than other architectures (e.g., file system) and offers advantages such as scalability and low cost.

SUMMARY

According to embodiments of the present invention, there is provided a computer-implemented method of protecting data in a protected storage system. An embodiment may include: storing, in an object-based storage, a replication of the protected storage system from a predetermined time point, in replicated content objects of a target disk, wherein a replicated content object stores data of an address apace of the protected storage system; obtaining information related to a write operation in the protected storage system, the information including: data stored on the protected storage system, and metadata related to the stored data; maintaining a journal by: including a copy of the stored data in a content entry in one or more journal content objects and storing the journal content objects in the object-based storage; including at least some of the metadata in a metadata entry in one or more metadata objects and storing the metadata objects in the object-based storage; and associating the metadata entry with the content entry; and periodically applying the data received before a predetermined time window from the journal content objects to the replicated content objects.

Furthermore, according to embodiments of the present invention, periodically applying the data may include: examining metadata objects in the journal to identify entries related to last writes to offsets, that occurred before the time window; generating a region-locator, wherein the region-locator includes a list of the offsets and, for an offset in the list, a reference to a content entry in a journal content object that includes data of the last write to the offset; using the region-locator to copy content of all last writes to a respective address space from the content entries to the corresponding replicated content object; and removing the copied content entries from the journal.

Furthermore, an embodiment of the method may include using the target disk and the journal to generate a replication of the protected storage system at a specified time, for example, by receiving a time value; examining metadata objects in the journal to identify entries related to last writes to offsets, that occurred before the time value; generating a region-locator, wherein the region-locator includes a list of the offsets and, for an offset in the list, a reference to a content entry in a journal content object that includes data of the last write to the offset; and using the region-locator to produce the replication of data stored on the protected storage system by: copying data from content entries in the journal for the offsets in the list; and copying data from the target disk for other offsets. The replication may be generated as a single object in the object storage.

Furthermore, an embodiment of the method may include: intercepting the write operation to the protected storage system to capture the data stored on the protected storage system; and recording the metadata related to the write operation.

According to embodiments of the present invention, there is provided a system for protecting data in a protected storage system. A system according to one embodiment may include a management unit. The management unit may be configured to: store, in an object-based storage, a replication of the protected storage system from a predetermined time point, in replicated content objects of a target disk, wherein a replicated content object stores data of an address apace of the protected storage system; obtain information related to a write operation in the protected storage system, the information including: data stored on the protected storage system, and metadata related to the stored data; maintain a journal by: including a copy of the stored data in a content entry in one or more journal content objects and storing the journal content objects in the object-based storage; including at least some of the metadata in a metadata entry in one or more metadata objects and storing the metadata objects in the object-based storage; and associating the metadata entry with the content entry; and periodically apply the data received before a predetermined time window from the journal content objects to the replicated content objects.

Furthermore, a system according to one embodiment may include: a change detection unit configured to capture the information related to the write operation in the protected storage system.

Furthermore, according to embodiments of the present invention, the management unit may be configured to periodically apply the data by: examining metadata objects in the journal to identify entries related to last writes to offsets, that occurred before the time window; generating a region-locator, wherein the region-locator includes a list of the offsets and, for an offset in the list, a reference to a content entry in a journal content object that includes data of the last write to the offset; using the region-locator to copy content of all last writes to a respective address space from the content entries to the corresponding replicated content object; and removing the copied content entries from the journal.

Furthermore, according to embodiments of the present invention, the a management unit may be configured to: use the target disk and the journal to generate a replication of the protected storage system at a specified time, for example by: receiving a time value; examining metadata objects in the journal to identify entries related to last writes to offsets, that occurred before the time value; generating a region-locator, wherein the region-locator includes a list of the offsets and, for an offset in the list, a reference to a content entry in a journal content object that includes data of the last write to the offset; and using the region-locator to produce a replication of data stored on the protected storage system by: copying data from content entries in the journal for the offsets in the list; and copying data from the target disk for other offsets. The replication may be generated as a single object in the object storage.

Furthermore, according to embodiments of the present invention, a metadata objects may be kept in a chronologically ordered stream, a metadata object may include at least one of: an offset in the protected storage device, a size, a reference to a copy of data written to a storage device and a timestamp, and the journal content objects, the metadata objects and the target content objects may have fixed size.

Furthermore, according to embodiments of the present invention, a protected system may be one of: a physical disk, a virtual disk and a virtual machine.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
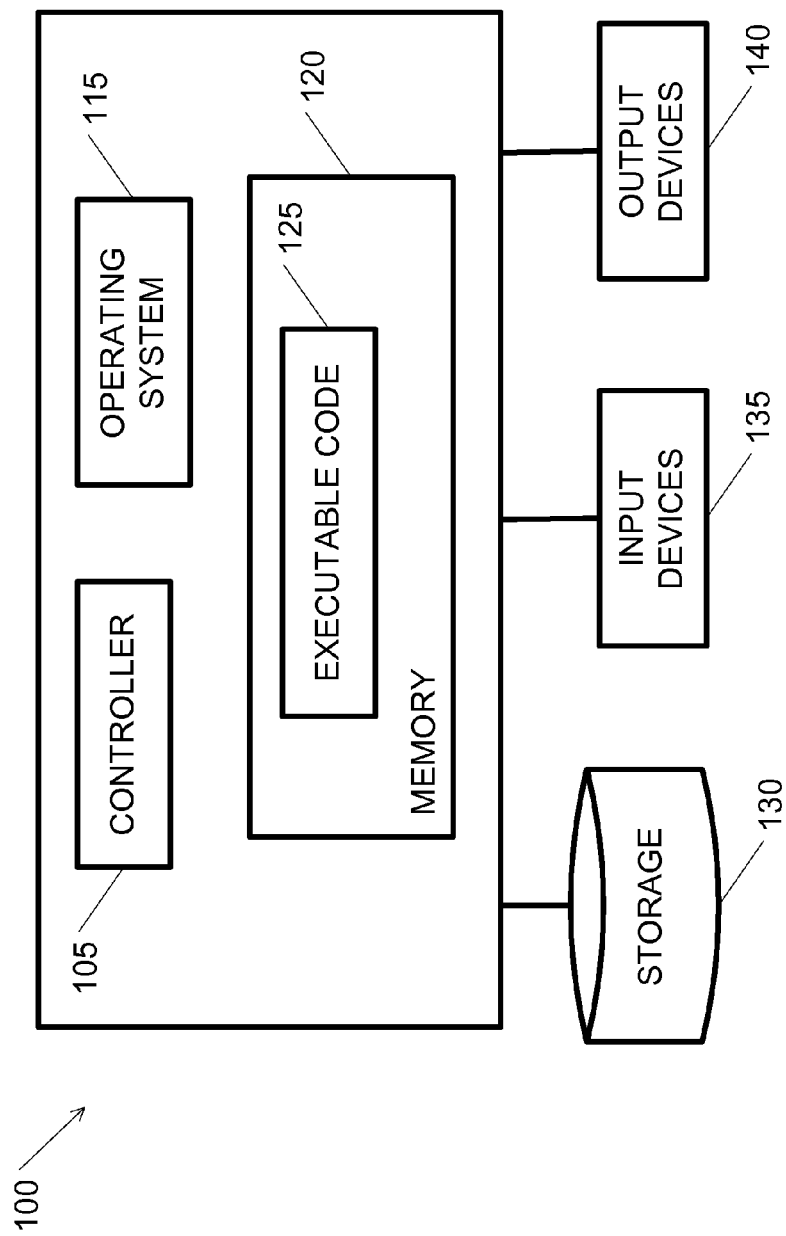
FIG. 1 shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to embodiments of the invention may store data obtained from a protected system in a recovery system. Data in a recovery system may be stored in two containers: a journal that may store all latest or recent writes to a protected system in a configured history period or time window; and a target disk data container that may store or save the rest of the data written to the protected system, e.g., a replication of the protected storage system from a predetermined time point. For example, if a protected disk or machine is configured to have a one hour history, then data in a target disk at a recovery system may contain a copy of content of the protected disk from one hour ago, and a journal may contain a copy of all writes to the protected disk that were done in the last hour. As used herein the term target disk may refer to a data storage, for example, a plurality of objects, (in the same or in other object storage as the journal), or any other data storage that serve as data container that may store or save the data written to the protected system before the time window, e.g., data written to the protected system that is not saved in the journal.

In some embodiments, a recovery system may be located in a remote site (recovery site). For example, a remote site may be geographically remote from the protected system. For example, a protected system may be located in a first city or state and a recovery system may be located in another city or state. In other embodiment, a recovery system may be co-located with the protected system or even embedded in the protected system. It will be understood that a protected system as referred to herein may be any applicable digital content storage system. For example, a protected system may be a set or array of disks attached to a computer or server (e.g., a redundant array of independent disks (RAID) as known in the art), or it may be a virtual machine (VM) connected to one or more virtual disks as known in the art.

A system and method according to embodiments of the invention may include a number of units or processes. For example, a first unit or method may capture data written to, or stored on, a disk of a protected system (e.g., a physical or a virtual disk). A second unit or method may insert a copy of the captured data into a journal as further described herein. A third unit, process or method may extract data related to data writes in a journal and apply the data writes to a target disk as further described herein. As used herein, applying the data to a target disk may refer to the process of copying content from the journal to the target disk and deleting the copied content from the journal. A fourth unit, process or method may use the journal and the target disk to generate, create or prepare disk replica of a protected disk or system, where the replica is from a certain or selected point in time. Of course, a single unit may perform some or all of the tasks or methods described herein or more than four units or processes may be used in some embodiments. Embodiments of the invention may continuously protect data of any storage system. Although VM is mainly referred to herein, it will be understood that any storage system (e.g., hard disk) may be protected by a system and method according to embodiments of the invention as described herein.

Generally, storing data in a journal and updating a target disk may be an on-going, or automatic process or operation, e.g., continuously performed in order to enable fail-over at any point in time. Using the journal and the target disk to generate, create and/or provide a copy (or replica) of a protected disk may be done based on, or in response to, a command from a user.

For example, in an exemplary flow according to an embodiment, a disk is protected with a 6 hours history window. In the exemplary flow, data written to a protected disk is captured, intercepted or otherwise obtained (e.g., copied from a disk after it was written thereto) and sent or provided to a unit in a recovery system (or at a recovery site). The unit writes the data to a journal. Six hours later, the data may be automatically deleted or removed from the journal and written or applied to a target disk. In order to create or provide a disk image (e.g., replication or backup) of the protected disk for a certain point in time, e.g. one hour ago, a unit may apply to the target disk data from the start of the journal up to the write that happened one hour ago.

Reference is made to FIG. 1, showing a high level block diagram of an exemplary computing device according to embodiments of the present invention. Computing device 100 may include a controller 105 that may be, for example, a central processing unit processor (CPU), a chip or any suitable computing or computational device, an operating system 115, a memory 120, executable code 125, storage 130, input devices 135 and output devices 140. Controller 105 may be configured to carry out methods described herein, and/or to execute or act as the various modules, units, etc., for example by executing code or software. More than one computing device 100 may be included, and one or more computing devices 100 may act as the various components, for example the components shown in FIG. 2. For example protection management unit 230 described herein may be, or may include components of, computing device 100. For example, by executing executable code 125 stored in memory 120, controller 105 may be configured to carry out a method of protecting data of a virtual machine as described herein. Controller 105 may be configured to generate a region-locator structure and use the region-locator structure to provide a replication of a protected storage system as described herein.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that protects a storage system as further described herein. Although, for the sake of clarity, a single item of executable code 125 is shown in FIG. 1, a system according to embodiments of the invention may include a plurality of executable code segments similar to executable code 125 that may be loaded into memory 120 and cause controller 105 to carry out methods described herein. For example, units or modules described herein may be, or may include, controller 105 and executable code 125.

Storage 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by input devices 135 and output devices 140. For example, a wired or wireless network interface card (NIC), a printer, a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105.

The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system according to embodiments of the invention may additionally include other suitable hardware components and/or software components. In some embodiments, a system may include or may be, for example, a personal computer, a desktop computer, a laptop computer, a workstation, a server computer, a network device, or any other suitable computing device. For example, a system according to embodiments of the invention as described herein may include one or more devices such as computing device 100.

Figure 2:
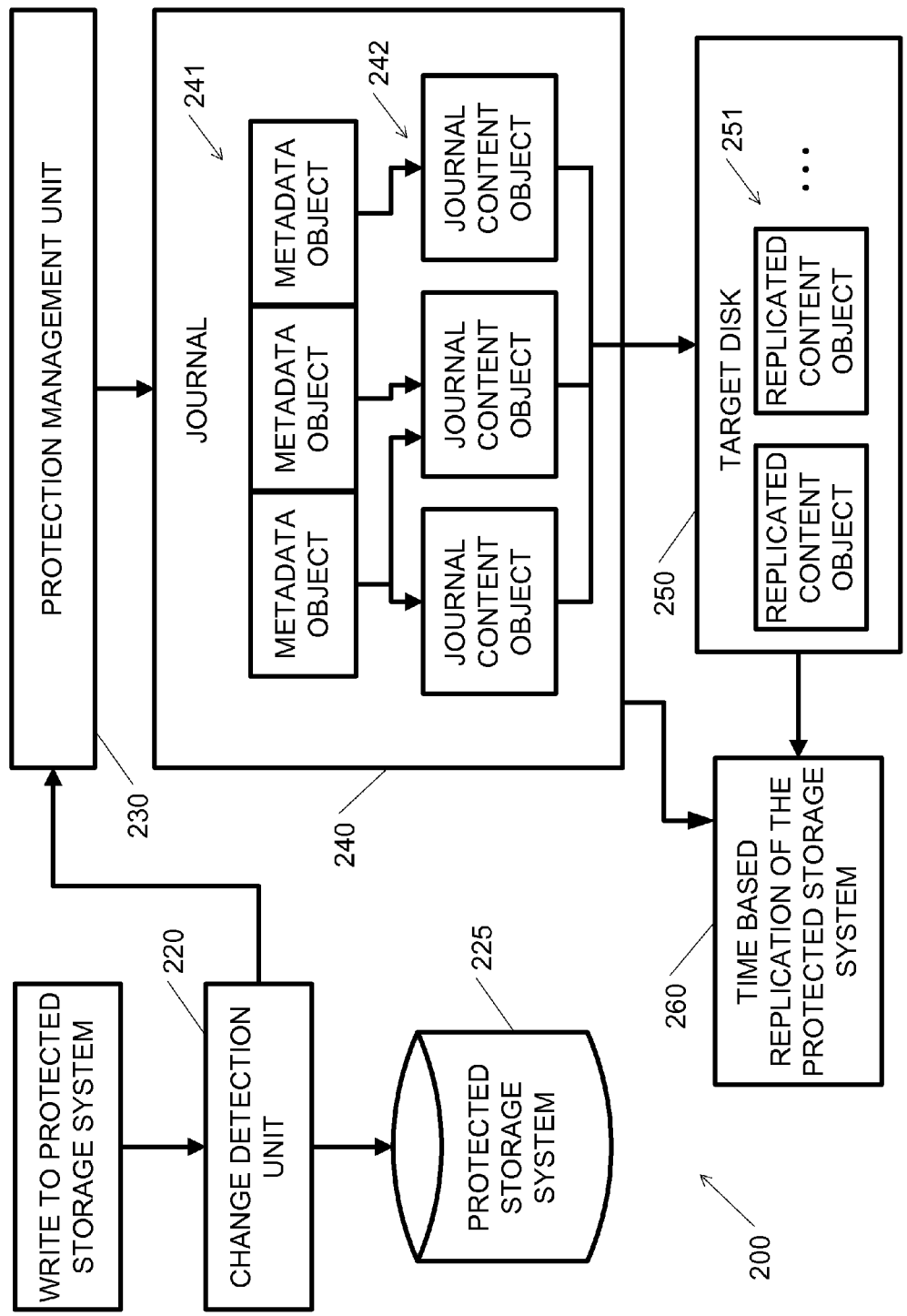
FIG. 2 is an overview of a system according to embodiments of the present invention.

Reference is made to FIG. 2, an overview of a system 200 and flows according to embodiments of the present invention. As shown, system 200 may include a change detection unit 220 that may (e.g. may be configured to) capture, intercept or otherwise obtain writes or other changes to protected storage system 225. For example, change detection unit 220 may copy data or content in input/output (TO) operations as, or when they occur. In another case, change detection unit 220 may use snapshots, e.g., periodically take a snapshot of, or scan, a protected storage system, identify changes in the protected storage system and send data and metadata to protection management unit 230 based on changes, e.g., data written after the previous snapshot may be sent to protection management unit 230. A snapshot of a protected system as referred to herein may include a list or description of data stored in the protected system at a particular point in time or during a particular time window or period. For example, a snapshot may include a list of files or blocks stored in a protected system, the size of the files, modification times of the files or blocks and so on. Accordingly, a previous and a subsequent snapshot may be used to identify changes made to a protected storage system, e.g., addition of files or data, or changes of memory blocks. Scanning a protected storage system may include listing or identifying content on the storage system. A subsequent scan may be used to identify differences made to the protected storage system, e.g., modifications of files or blocks etc. Additionally or alternatively, changes may be identified using a primitive that is provided in many storage systems which includes a list of changed blocks between two consequent snapshots, for example Changed Block Tracking (CBT) primitive. As used herein, a memory block or a block may refer to a fixed-size memory chunk.

Protected storage system may be any applicable storage system, e.g., a disk or a virtual disk used by a VM. Any storage system may be a protected system or protected storage system according to embodiments of the invention. Generally, a protected storage system as referred to herein may be any system used for storing digital information. A protected system or protected storage system may be any system for which a recovery system or method as described herein maintains data and information such as metadata and content stored and maintained by system 200 as described herein. It will be understood that the scope of the invention is not limited by the type of the protected system. As further shown, system 200 may include a protection management unit 230, a journal 240 that includes one or more metadata objects 241 and one or more journal content objects 242. As shown, a system 200 may include a target disk 250 that includes one or more replicated content objects 251. As further shown, system 200 may include or generate and provide, a time based replication of protected storage system 225. A journal as referred to herein may be, or may include, a set of digital content objects, e.g., files, memory segments and the like. As described herein, a journal (e.g., journal 240) may be or may include a set of metadata objects and a set of content objects. For example, as described herein, a journal may include a set of metadata objects that store metadata related to writes to a protected system and a set of content objects that include the actual data written to, or stored on, the protected system. In an embodiment, a journal includes metadata and actual data relevant to a time period or window. For example, a journal may include data and metadata related to write operations performed in the last hour. As described, actual data and metadata from a predetermined time point or related to a time period not covered by a journal may be stored in a target disk data construct (e.g., target disk data 250 described herein).

Metadata objects and content objects described herein may be objects used in object storage techniques (e.g., object-based storage) as known in the art. For example, content objects 242 and other objects shown in FIG. 2 may be written to, or stored in, a storage system using a single command or operation.

Generally, a protected storage system as shown by protected storage system 225 may be any storage system, e.g., a disk or a virtual machine. A backup storage system or device may include protection management unit 230, journal 240 and/or target disk data 250. A backup storage system or device may create a time based replication of a protected storage system as shown by block 260. A backup storage system or device used to protect a storage system may be distributed, e.g., protection management unit 230 may be a unit in a first location (e.g. geographic location, building, etc.), journal 240 may be stored and maintained in a second location and target disk data 250 may be in a third location. As described, in other embodiments, a backup storage system or device may be located near (or embedded in) a protected storage system.

In some embodiments, protection management unit 230, journal 240 and target disk 250 may be local units or elements, e.g., at the same location protected storage system 225. For example, the same server or servers in the same data center may host protection management unit 230, journal 240 and target disk 250 and protected storage system 225. In other embodiments, components of system 200 may be distributed. For example, protected storage system 225 may be located in a data center, journal 240 and target disk 250 may be installed in a remote site and protection management unit 230 may be included in a server on the internet.

Where applicable, change detection unit 220, protection management unit 230 and other components and units described herein, may be similar to, or may include components of, device 100 described herein. For example, change detection unit 220 and protection management unit 230 may be, or may include, a controller 105, memory 120 and executable code 125. In some embodiments, units shown in FIG. 2 and elsewhere may be tasks or applications executed by controller 105.

In some embodiments, change detection unit 220 detects changes in protected storage system 225, for example, by intercepting write operations or by identifying changes in snapshots as disclosed herein. Detecting changes by change detection unit 220 may include capturing the data (actual content) being written as well as capturing metadata. For example, metadata captured or generated by change detection unit 220 may include the time of the write operation (timestamp), an offset (or address) of the write, the size or length of data written or any other metadata related to the write operation or the content being written. Any metadata captured or calculated as described herein may be included in metadata objects, e.g., in metadata objects 241. Offsets or address in memory may be given in any applicable manner or unit, for example in bytes, megabytes, in blocks of memory, etc.

Data captured, generated or calculated by change detection unit 220 may be provided to protection management unit 230. For example, change detection unit 220 may send or transmit captured data and captured or generated metadata to protection management unit 230. Protection management unit 230 may store (e.g. may be configured to store) captured data in a content entry in one or more content objects 242 in journal 240 and may further insert metadata related to the write operation into one or more metadata objects 241. Protection management unit 230 may associate the metadata entry with the corresponding content entry e.g., by including a pointer or a reference in the metadata entry to the location of the content entry in journal 240. Metadata captured, calculated or generated by change detection unit 220 may be, for example, an address or offset to which data is written on protected storage system 225, the time the data was written, an identification of a user or application that wrote the data and so on.

According to embodiments of the invention, data of replicated protected storage system 225 (that may be for example a disk or a virtual disk) in a recovery system may be stored in target disk 250 and journal 240. In some embodiments, metadata entries in metadata objects 241 in journal 240 are stored or maintained in a first in first out (FIFO) structure or queue as known in the art, where elements are inserted into a list or container in the order received and are further removed from the container or list according to the order inserted. For example, metadata entries related to writes (or write operations) in protected storage system 225 may be added into journal 240 according to the order, in time, of the write operations. For example, metadata entries in metadata objects 241 are arranged in as FIFO list or stack such that the order of writes to protected storage system 225 is maintained or reflected by the list of metadata entries in metadata objects 241.

In some embodiments, metadata objects 241 and content objects 242 in journal 240 only include information from up to a specific history, time period or time window, and copy of data written to protected storage system 225 from a predetermined time point before that time window is stored in content objects 251 in target disk 250. For example, if a history of two ("2") hours is to be stored or kept for protected storage system 225 then metadata objects 241 and content objects 242 in journal 240 may include information (metadata and actual content) related to the past or last two hours, and data related to writes that occurred more than two hours ago is stored in content objects 251 in target disk 250.

As known in the art, when using object storage technique or architecture (or object-based storage), an object cannot by modified, e.g., the way a file in a file system is modified. For example, in order to modify portion of an object, one needs to obtain the object, modify the object, and then re-write the entire object into the object-based storage. For example, known systems and methods that use object-based storage technique for backup and disaster recovery simply store objects that include backup data into objects. When the data to be backed up changes, known systems and methods re-write the objects. For example, an object that includes data of a protected disk is re-written every time data on the protected disk changes. Clearly, these methods and systems are inefficient since they need to re-write large amounts of data in order to reflect small changes in the protected systems.

According to embodiments of the invention, data in journal 240 and in target disk 250 is stored in small, fixed-size objects. For example, in an embodiment, objects of 16 megabytes (MB) are used. While 16 MB objects are mainly referred to herein it will be understood that any other size of objects may be applicable and the scope of the invention is not limited by the size of objects used. For example, objects of 8 MB or 32 MB may be used. The size of objects used may be according to a configuration parameter or value and may be decided upon based on analyzing a protected system. For example, object size of a system may be selected based on a typical size of write operations, cost, characteristics of the object storage, storage management considerations, performance etc.

Using small object size in journal 240 and in target disk 250 as described enables systems and methods of the invention to limit or dramatically reduce the amount of data that is being re-written into object storage as part of writing new data to journal 240 or applying data from journal 240 to target disk 250 as described. For example, using 16 MB content objects, adding data to journal 240 to represent a write to protected storage system 225 would only require writing 16 MB of data whereas, if journal 240 was stored or kept in a single object, adding data to journal 240 to represent a single write to protected storage system 225 would necessitate re-writing the entire journal 240.

As described, information in journal 240 is generally divided into two categories, metadata (in metadata objects 241) and actual data or content (in content objects 242).

For each write to protected storage system 225, there is in one embodiment one metadata entry with the write information and one data entry with content of the write. In some embodiments, metadata and a copy of actual data written to protected storage system 225 are saved on different or separate, small, fixed size, disk objects. The order of the writes is maintained in a metadata stream. For example and as shown in FIG. 2, metadata objects 241 are maintained as a stream of objects that are chained according to the order of writes to protected storage system 225. A metadata object in metadata objects 241 may include one or more entries, each corresponding to a write of data to protected storage system 225. The entries in each of metadata objects 241 may be ordered according to the order, in time, of the related writes to protected storage system 225. Accordingly, the chronological order of writes to protected storage system 225 is maintained by the stream of metadata objects 241 and by the entries in metadata objects 241.

As described, metadata objects 241 may be objects of small size (e.g., 16 MB) and may each contain a plurality of entries. For example, each entry in each of metadata objects 241 may include the address to which data was written to protected storage system 225. For example, the address may be in the form of an offset in a virtual disk (e.g., a block or sector number). An entry in each of metadata objects 241 may include the length, amount or size of data written to protected storage system 225. A metadata object may include a reference to a copy of data written to target disk data 250. A metadata object may include a reference to a copy of data written to the protected system and stored in a content object. For example, a metadata object may include a reference to one of content objects 242.

An entry in each of metadata objects 241 may include a location or identifier of the content object that stores the actual data or content written. For example, a name of the content object included in content objects 242 that stores the actual data may be included in an entry in one of metadata objects 241 such that using an entry in metadata objects 241, the actual content may be found.

An entry in each of metadata objects 241 may include an offset in the content objects 242. For example, a content object 242 may include data corresponding to a number of write operations. For example, data written to protected storage system 225 in a first write operation may be stored at offset 0 in one of content objects 242 and data written to protected storage system 225 in a second write operation may be stored at offset 512 in the same content object. Accordingly, a first entry, corresponding to the first write, in one of metadata objects 241 may point to offset 0 in the content object included in content objects 242 and a second entry in the metadata object may point to offset 512 in the same content object. An entry in each of metadata objects 241 may include a timestamp that enables determining the time the write to protected storage system 225 was made.

As described, the metadata entries may be fully ordered. The objects that contain the metadata stream may be maintained as a list, and inside a metadata object the write order may match the metadata entry order. The actual content written to protected storage system 225 may be stored in content objects 242 that may be small, fixed size objects. The actual content written to protected storage system 225 and stored in content objects 242 may be pointed to from within the metadata write entries in metadata stream 241.

A flow of adding protected disk writes to journal 240 may include accumulating writes data in memory. For example, a 0.5 MB, 1 MB or 2 MB, or another size of memory chunks or segments may be allocated (e.g., controller 105 included in protection management unit 230 may allocate a segment in memory 120 or on storage 130) and data captured by change detection unit 220 may be stored in the memory segments. 1 MB or another size of memory chunks or segments may be allocated on any suitable storage system or device, e.g., a memory, disk, flash device, etc. According to some embodiments, the memory chunks or segments may be allocated on the object storage itself, as temporary smaller objects. When filled with data, the memory chunks or segments may be stored at one of content objects 242 in the journal as disclosed herein, and the memory chunks or segments may be deleted.

A method or flow may include allocating a content object (e.g., a content object in content objects 242), designating the content object as the current object and writing the data from the memory segment to the content object. If the current content object cannot accommodate the copy data of the data written to protected storage system 225, e.g., because it is already closed or full, the method embodiment or flow may include allocating another content object and designating it the current content object.

The flow may further include writing information into metadata entries and setting a pointer or reference in a metadata entry such that the corresponding data or content in the content object can be accessed using the metadata entry. If there is not enough space to accommodate the metadata entries of in the current metadata object, the method embodiment or flow may include allocating a new metadata object, and designating it the current metadata object. For example, protection management unit 230 may always use one of metadata objects 241 as the current metadata object and one of content objects 242 as the current content object. When a metadata object is full or cannot accommodate metadata to be stored, it may be chained into the stream of metadata objects 241 and a new object may be allocated. When a content object is full or cannot accommodate content to be stored, it may be stored as shown by content objects 242 and a new content object may be allocated and designated as the current object. For the sake of clarity, the current metadata object and current content object are not shown in FIG. 2, however, these objects may be similar to objects 241 and 242 respectively.

Content objects in target disk 250 may be similar to content objects 242 in journal 240, e.g., they may be small size objects, e.g., 16 MB objects that together comprise the content of protected storage system 225 which is not included in journal 240. Generally, a copy of some of the content of protected storage system 225 may be included in journal 240 and a copy of the rest of the content of protected storage system 225 may be included in target disk 250. For example, all writes in a configured time window, time or history period may be included in journal 240 and writes or updates that occurred prior to the time window or time period may be included in target disk 250.

Each of objects 251 in target disk 250 may represent, or include, content of a corresponding segment or address apace of protected storage system 225. For example, if the size of content objects 251 is 16 MB then each content object in content objects 251 may represent, or include the content in, a corresponding 16 MB segment or address apace on protected storage system 225.

Each one of objects 251 may represent 16 MB of content of certain offset in protected storage system 225. If a 16 MB disk region in protected storage system 225 contains no data e.g., only zeros, then there may be no corresponding 16 MB object in objects 251. For instance, starting from offset 0, the first 48 MB in a target disk may include, or be composed of, 3 16 MB objects to represent (or stores the content of) the first 48 MB in the protected storage system, one for address space 0-16M, one for 16-32M and one for 32-48M. However, if the protected system has no data stored in the space 16-32M then the target disk may include only 2 objects for representing (or storing content of) the first 48 MB in the protected storage system. Accordingly, according to embodiments of the invention, space required for a backup of protected storage system 225 may be less than the overall size of protected storage system 225.

A system and method according to embodiments of the invention may apply data in journal 240 to target disk 250. A system and method according to embodiments of the invention may use journal 240 and target disk 250 to create a disk replica for fail-over, e.g., failing-over of protected storage system 225 to an alternative disk or storage system.

A system and method according to embodiments of the invention may use a data structure referred to herein as a region-locator. A region-locator, or a plurality of region-locators, may be generated and used for applying data from journal 240 to target disk 250 and for creating a disk replica, as disclosed herein. A region-locator may be used to determine whether or not data was ever written to an offset in protected storage system 225 at a specified time and, therefore, whether or not data should be written to the corresponding offset in target disk 250. A region-locator may be used to determine, identify or locate, for each offset in target disk 250, the last write to the offset before a specified time as represented or included in journal 240. For example, without a region-locator described herein, in order to know or obtain the content that was last written to a particular offset, e.g., offset 0, in protected storage system 225 as stored or represented in journal 240, a unit would need to traverse all metadata objects 241 in journal 240 to find the latest write, if any, to offset 0. Using a region-locator, a unit only needs to traverse or examine the set of metadata objects 241 once.

Additionally, the region-locator may be used to map or accumulate writes to content objects 251 in target disk 250. The region-locator may be used to determine, identify or locate, for each address space of a content object 251 all the writes to the corresponding address space in protected storage system 225 as represented or included in journal 240. For example, for a 16 MB content object that represents (or store content of) address space 0-16M, region-locator may be used to determine, identify or locate all writes to address space 0-16M in protected storage system 225 as represented or included in journal 240. According to some embodiments, if a plurality of writes has been performed to that same offset within an address space, the last write may be selected.

For example, protection management unit 230 may examine each entry in each of metadata objects 241, determine, for each entry, the time and offset of the relevant write operation in journal 40, e.g., the content object in content objects 241 that stores the data written as well as an offset in the content object. Accordingly, following a single pass over metadata objects 241, a region-locator list or structure may include, or be used to locate, for each address space, all the writes to that address space, and for each offset, the last write to the offset. For example, using a region-locator structure, finding all the latest writes to address space 0-16 will not require any further traversing or examining of metadata in journal 240 since the content objects containing the writes to any offset within address space 0-16 may be readily identified by the region-locator structure. For example, a region-locator structure may include an entry for offsets in an address space and each entry in the region-locator structure may include a pointer or reference to the content object (in content objects 241) that stores the last write to the offset. As described, each one of content objects 242 may include content written to one or more offsets in one or more address spaces. An entry in a region-locator structure may further include an offset in the content object 241 such that the data or content of interest may be readily extracted from the content object.

Table 1 provides a non-limiting example of a region-locator. The first column includes the offsets of the last write operations stored in journal 240, expressed in blocks, and the second column includes in offsets in the journal.

TABLE 1

An exemplary region-locator.

| Key: address space in the protected storage (in blocks) | Location in Journal (in blocks) |
|---|---|
| Blocks 1-10 | Offset 14230 in Journal |
| Blocks 13-15 | Offset 2340 in Journal |
| Blocks 200-250 | Offset 3420 in Journal |
| Blocks 700-950 | Offset 153240 in Journal |

In the example above, blocks 1-20 that were mapped into the region-locator are to be found in the journal at offset 14230. Blocks 21-199, however, are to be found in target disk 250. Thus they are not listed in the region-locator. Blocks 200-250, and 700-950, are also found in the journal, starting at offsets 3420 and 153240, respectively. For example, block 220 may be found in offset 3440 (3420+20) in the journal and block 150 may be found in offset 150 in target disk 250. The region-locator may be implemented as any data structure that allows efficiently searching based on key such as Red black tree etc.

The advantage of using a region-locator structure as described may be understood when considering that, typically, a number of writes may be made to the same offset and a number of writes may be made to various offsets that are replicated within a single replicated content object 251. For example, different data or content may be written to offset 1-10 blocks in a possibly large number of write operations over time, or different data or content may be written to blocks at offsets 1-10 and 13-15 blocks, which may be a part of an address space of a single replicated content object 251. Without the region-locator structure, in order to derive or produce a content object that includes the up to date, or latest, content in the single content object 251, all writes to offset 1-10 blocks and to the other offsets of the address apace of the single replicated content object 251 would need to be applied separately to the content object 251. Thus, the process of obtaining, modifying and re-writing would have to be repeated for each write to offsets included within content object 251. In this example, obtaining, modifying and re-writing would have to be repeated two times, one for offset 1-10 blocks and one for offset 13-15 blocks. Using the region-locator structure as described herein, data for producing a content object that includes the latest or up to date content of all offsets of a content object may be obtained with minimal operations. Using the data in the region-locator structure, data may be read from journal content objects 242 that store the content that was written to any offset within the address space of replicated content object 251 using read operations, and written to the content object using a single write operation. Thus, a single update of the replicated content object 251 with all the up to date content that was written to any offset within the address space of content object 251, may be all that is required. A single update of a content object 251 requires obtaining, modifying and re-writing content object 251 into the object-based storage only once. This saves repeating the process of obtaining, modifying and re-writing for each write within content object 251.

A system and method according to embodiments of the invention may apply or transfer data from journal 240 to target disk 250. For example, after identifying or detecting one or more metadata entries related to a last write to one or more offsets of an address space of a content object 251 in a protected storage system, the associated content entries that include data written to the one or more offsets may be identified (e.g., using a reference in the metadata entries as described) and data in the content entries may be used to create and provide a replication of data stored on the protected storage system. A replication may be produced based on any criteria. For example, writes to a specific offset or writes during a specific time period may be identified based on information in metadata entries, relevant content entries may then be identified (e.g., using references in metadata entries) and the relevant content entries in the relevant content objects may then be used to create a replication of data in the protected storage system.

According to embodiments of the invention, applying or transferring data from journal 240 to target disk 250 may be performed automatically by a system (e.g., by protection management unit 230) to free journal 240 data such that journal 240 is maintained at a reasonable size, or in order to maintain in journal 240 data for a required history or time window or time period. For example, if a protected system (e.g., a disk) is configured for 1 hour history, a system according to embodiments of the invention may constantly or continuously store or keep the writes in the journal 240 to be the writes in the last hour by applying older data to target disk 250, e.g., by transferring data in content objects 242 to content objects 251 in target disk 250 and removing no longer needed metadata objects 241 from the stream of metadata objects in journal 240. In some embodiments, a system according to embodiments of the invention may apply older data to target disk 250 periodically, e.g., every predetermined time period. The time period for applying older data to target disk 250 may be shorter than the journal time window. For example, journal 240 may be configured to keep information from up to a time window of 24 hours, and applying older data to target disk 250 may be performed every hour. Thus, every hour information that was written to protected system 225 more than 24 hours ago may be written to or applied to target disk 250.

Journal 240 may be periodically purged, e.g., every 1, 10, 12 or 24 hours. According to embodiments of the present invention, writing or applying content in journal 240 that is older than a specified time window (e.g., 10, 24, 48 hours, or any other time duration), to target disk 250 may include creating a region-locator structure for the earliest write entries, e.g., the earliest 10, 12 or 24 hours, in journal 240 and then replacing the 16 MB objects in the target disk data with the new content from journal 240 according to the region locator. As described, using a region locator may ensure that each content objects 251 in target disk 250 is written at most one time.

An objective of continuous data protection may be enabling a fail-over of a protected storage system to a target site. In order to achieve this, a system and method according to embodiments of the invention may produce a disk image of the protected storage system, wherein the disk image is for a specified time. For example, a user may want to be provided with an image of protected storage system 225 as it was 2 hours ago, or three days ago, or the user may want an image that reflects the latest possible or available state of protected storage system 225. As described, using a region locator, a system and method according to embodiments of the invention may identify and find the content written to protected storage system 225 based on a time value. A time value may be, or may include, a specification of a time period or a history period. For example, a time value may include a start time and an end time of a time period thus defining a time or history window. In other cases, a time value may be an indication of a time, e.g., an hour, minute and second of a specific day. Using a time value, an embodiment of the invention may identify writes to a protected system. For example, using a time value that specifies a time window or period, all metadata entries related to writes that occurred before or during the time window may be identified as described herein. In another case, using a time value that only indicates a specific time, all metadata entries related to writes that occurred before the indicated time (or after the indicated time) may be identified. As described, using the identified metadata entries, the associated content entries may be identified or located. Accordingly, a replication of data of a protected system may be created based on any time related criteria using a time value as described.

For example, the region locator structure may be generated such that it includes references to content object and offsets therein such that a replication of protected storage system 225 as it was 2 hours ago, or three days ago may be generated. Once content objects that store data for all offsets in protected storage system 225 are obtained or referenced, protection management unit 230 may copy content objects to target disk 250. Assuming protected storage system 225 is a disk, a disk image of protected storage system 225 may be created by applying data from journal 240 to target disk 250 as described and writing data in the content objects of target disk 250 to a disk, e.g., a disk connected to a server or a disk in a VM pointed to by a user.

Figure 3:
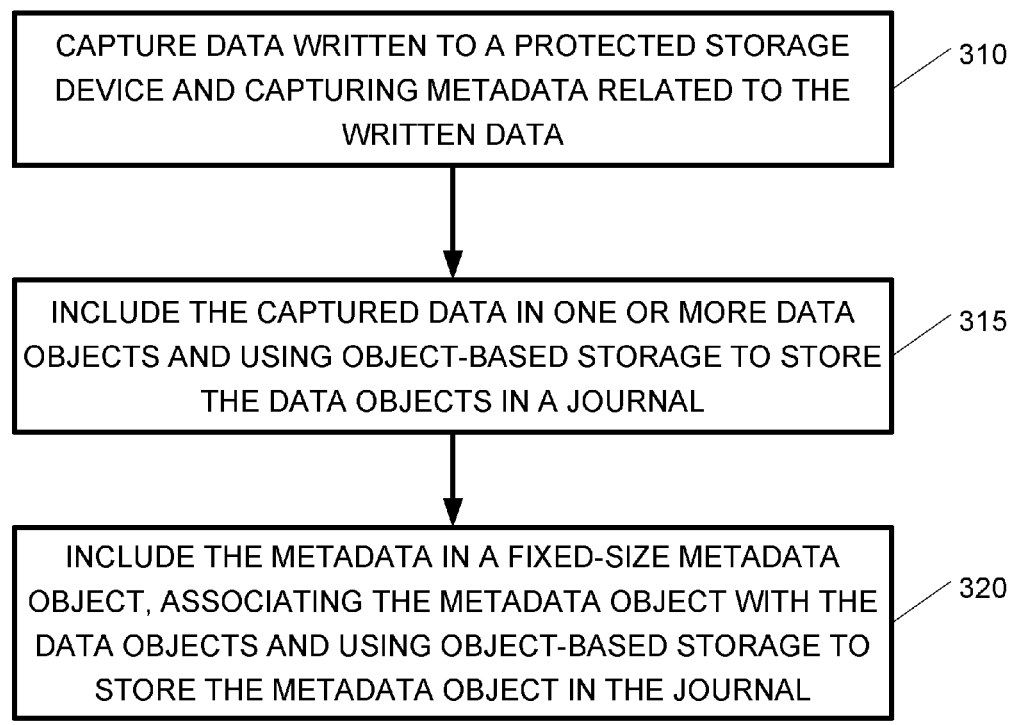
FIG. 3 shows a flowchart of a method for journaling in an object storage data protection system according to embodiments of the present invention.

Reference is now made to FIG. 3 that show a flowchart of a method for journaling in an object storage data protection system according to an embodiment of the present invention. As shown by block 310, data written to a protected storage device may be captured and metadata related to the written data may be captured. For example, change detection unit 220 may detect changes in protected storage system 225, for example by intercepting write operations, and may capture data written to, or stored on, protected storage system 225. As described, change detection unit 220 may further capture, generate or identify metadata related to a write of data, e.g., change detection unit 220 may capture or determine an offset to which data is written on protected storage system 225, a time of the write operation and the length or amount of data written.

As shown by block 315, the captured data may be included or stored in a content entry in one or more content objects and using object-based storage technique the content objects may be stored in a journal. For example, change detection unit 220 may detect changes in protected storage system 225 for example, for example by intercepting writes to a protected storage system (e.g., writes to a physical disk or writes to a virtual disk in a VM) in a first site and may send captured data and related metadata to protection management unit 230 in a second, possibly remote or separate, site. As described herein, protection management unit 230 may insert the captured data, as a content entry, into fixed size, small content objects and store the content objects in a journal in an object-based storage system using object-based storage technique. For example, a commercial object-based storage system or platform (e.g., S3 provided by Amazon) may be used to store content objects in a journal. The flow of adding protected disk writes to the journal may include accumulating writes data or content entries in memory, for example, in e.g., 0.5 MB, 1 MB or 2 MB memory chunks or segments, and storing the memory chunks or segments as content objects in a journal in an object-based storage system using object-based storage technique.

According to embodiments of the invention, information related to writing data to a protected system may be stored or recorded in a recovery system. The information stored may include the actual data written to the protected system (e.g., in content entries as shown by block 315 and described herein) and metadata related to the writing or storing of the actual data. For example, metadata (e.g., time, offset and the like) may be stored in metadata entries in metadata objects as shown by block 320 and described herein.

As shown by block 320, the metadata may be included or stored in metadata entries in a fixed-size metadata objects, and the metadata entries may be associated with the content entries. Object-based storage techniques may be used to store the metadata object in the journal. Fixed-size objects used with object-based storage techniques are known in the art. Fixed-size objects may be a memory construct or may be objects or constructs stored on a disk or other storage media. For example, a set of fixed-size objects may be a set of objects (e.g., files or memory segments) where each of the objects has the same size. For example, as opposed to files that may be of any size, fixed-size objects are objects that, regardless of the amount data they contain, have a fixed size. For example, the size of a fixed size object stored in a disk or other storage system may be 16 MB even if the objects only contains 2 MB of data. Fixed-size objects are used by object based systems as known in the art. Using fixed size objects relieves a system from tracking or otherwise dealing with the size of objects being stored, read or otherwise manipulated. A system using fixed-size objects (e.g., object based systems known in the art) may provide basic, simple (also referred to in the art as atomic) operations such as read, write or delete objects without dealing with the size of the objects. In contrast, variable size objects (e.g., files known in the art) may have variable size, e.g., a file may be extended in size as more data is added to the file.

For example, protection management unit 230 may include metadata in metadata objects 241 in journal 240 where the metadata objects 241 are objects of fixed, small size, e.g., objects that are each 0.5 MB, 1 MB or 2 MB in size, or (as with other parameters discussed herein) other sizes. Protection management unit 230 may include a copy of actual data written to protected storage system 225 in fixed-size content objects 251, e.g., objects that are each 16 MB in size.

As described, metadata entries in metadata objects 241 may be associated with content entries in content objects 242 such that each metadata entry for a write operation is associated with the actual data or content entry that was stored on the protected storage as part of the write operation. For example, pointers as known in the art may be used to associate or link a metadata entry included in metadata objects 241 with a content entry included in content objects 242. In other cases, a reference (e.g., a name or address) of content entry in content objects 242 may be included in metadata entries thus associating metadata entries with content entries, enabling identifying content entries associated with a metadata entry based on a reference included in the metadata entry. In yet other cases, a list may be used whereby, for each metadata entry, an entry in the list indicates the content entry associated with the metadata entry.

Figure 4:
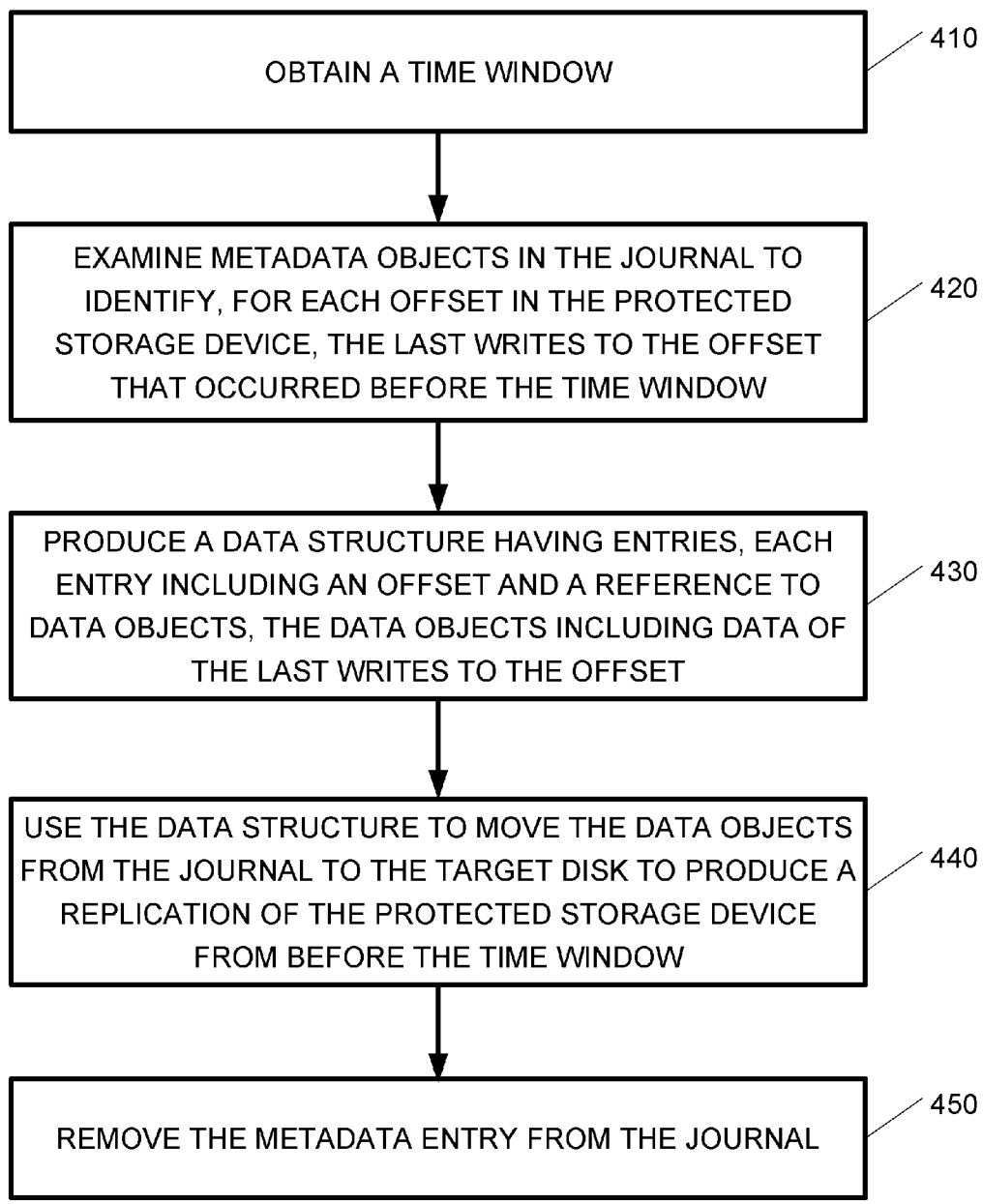
FIG. 4 shows a flowchart of a method for applying the journal to the target disk according to embodiments of the present invention.

Reference is now made to FIG. 4 which shows a flowchart of a method for applying the journal to the target disk according to embodiments of the present invention. Applying data from journal 240 to target disk 250 may be performed periodically, according to system design, for example, every 10, 12 or 24 hours, or another time period.

As shown by block 410, a time window, history parameter or time period value may be obtained. According to some embodiments the time window may be one of the system parameters that may be determined or entered, for example, by a system operator. According to embodiments of the invention the journal is configured to store all writes to a protected system performed during a recent time period, defined by the time window. For example, the time window may indicate that the journal is to maintain data for the past 24 hours. According to some embodiments, the time window may be used to detect, in the journal, a metadata entry related to a write performed before the time window. Since metadata objects (end metadata entries in the metadata objects) may be chronologically arranged, e.g., in the form of a stream according to time, detecting metadata entries related to writes performed before the time window may include traversing the stream of metadata objects 241 and identifying the last write that occurred before the time window. For example, if a time window of 24 hours is defined than the last write to protected storage 225 that is outside the time window may be one that occurred 24 hours and two seconds ago. Once the last write before the time or history window is identified, all writes that occurred before that write may be considered as old or outside the time or history window.

As shown by block 420, metadata objects in the journal may be examined to identify, for offsets in the protected storage device, the last write to the offset that occurred before the time window. As described, metadata entries in journal 240 may include an offset in protected storage system 225 that may serve as an address of the related write. Protection management unit 230 may scan all metadata entries in journal 240 and identify the last write to the offset for each offset that data was written to before the time window.

For example, upon finding a first metadata entry related to a write to offset 0 that occurred before the indicated time, protected storage system 225 may record or mark the first metadata entry as the last write to the offset that occurred before the time window. If, continuing to examine metadata entries in journal 240, protection management unit 230 finds a second metadata entry related to a more recent write to offset 0 that also occurred before the time window, protected storage system 225 may record or mark the second entry as the last write to offset 0 that occurred before the time window. Accordingly, following a single pass over all metadata entries in metadata objects 241 from before that time window, protected storage system 225 may find the metadata entry related to the most recent or last write to offset 0 that occurred before the time window. In a similar way, protected storage system 225 may find, in a single pass over metadata in journal 240, the last write to each offset in a protected storage system that occurred before the time window. Accordingly, by traversing once the stream of metadata objects 241 in journal 240, a system and method according to embodiments of the invention may produce a list of structure that includes, for each offset or address in a protected storage system, the last write of data that took place before or up to the specified or indicated time window.

As shown by block 430, a data structure, also referred to herein as the region-locator, having a list of entries may be produced, each entry including an offset and a reference to a content entry in a content object, the content entry including data of the last write to the offset. For example, following a single pass over a set of metadata entries in metadata objects 241, the relevant metadata entries may be identified. As described, metadata entries may include a reference or pointer to the relevant content entries included in content objects 242. Accordingly, provided with metadata entries as described, protection management unit 230 may generate a region-locator structure as described herein that may include, a list of offsets and for each offset in the list, a reference to the content entries containing the last content or data that was written to the offset before the specified or indicated time.

Additionally, the region-locator may be used to map or accumulate writes to specific content objects 251 in target disk 250. The region-locator may indicate, for each address space of a content object 251 all last writes to the corresponding address space in protected storage system 225 from before the time window, as represented or included in journal 240. For example, following a single pass over a set of metadata entries in metadata objects 241, the relevant metadata entries of each address space of each content object 251 from before the time window may be identified. For example, for a 16 MB content object that represents (or store content of) address space 0-16M, the region-locator may provide indication of all writes to address space 0-16M in protected storage system 225 from before the time window as represented or included in journal 240. If a plurality of writes has been performed to the same offset within an address space before the time window, the last write will be selected.

As shown by block 440, the data structure may be used to move content entries from journal 240 to target disk 250 to produce a replication of the protected storage device according to the time window. For example, if an embodiment of the system initiates applying of writes from before the time window to the target disk, then the region-locator as described herein may be generated such that it includes metadata entries related to the most recent writes to protected storage system 225 that occurred before the time window. The region-locator may include indications to the most recent writes to each address space before the time window corresponding to each content object 251. Thus, the region-locator may be used to determine, identify or locate the most recent writes to each address space before the time window corresponding to each content object 251. Using the metadata entries in the region-locator, the content entries in the content objects of each address space may be copied or applied to a corresponding content object 251 in target disk 250, possibly updating each content object 251 no more than once.

As shown by block 450, the content entry and metadata entry may be removed from journal 240. For example, after the actual content written in an operation and included in a content entry in content objects 242 is moved or copied to target disk 250, the content entry and related metadata may be removed from journal 240 by removing the content entry from content objects 251 and the metadata entry from metadata objects 241. Accordingly, a journal may be maintained such that it includes data and metadata related to a configured time window.

Figure 5:
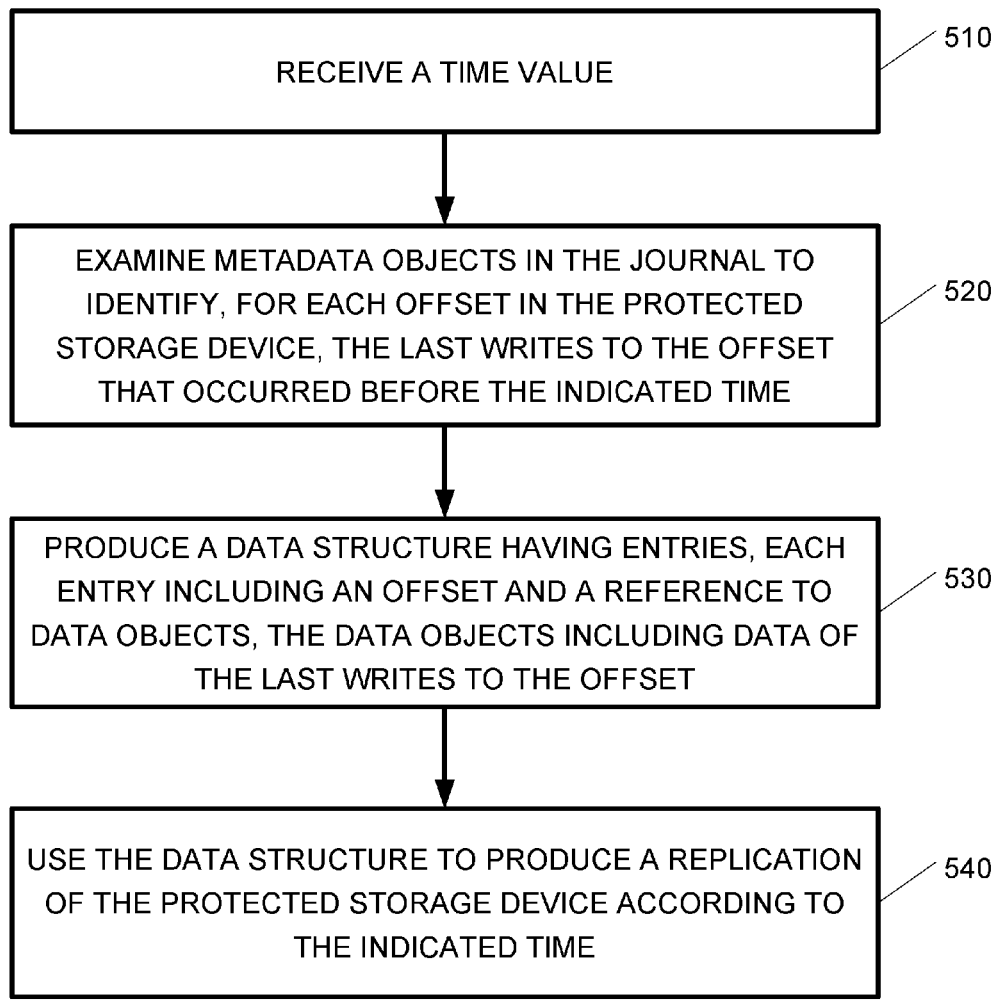
FIG. 5 shows a flowchart of a method for creating a disk replica from the journal and the target disk according to embodiments of the present invention.

Reference is now made to FIG. 5 which shows a flowchart of a method for creating a disk replica from the journal and the target disk according to embodiments of the present invention.

As shown by block 510, a time value or time stamp may be received. For example, a system and method according to embodiments of the invention may receive a time value that indicates a time and date for which a replication or image of a protected storage system is to be provided. For example, a user may want a replication or image of protected storage system 225 as it was five hours ago, two day ago or the user may want to be provided the most recent backup or current image of protected storage system 225.

As shown by block 520, metadata objects in the journal may be examined to identify, for each offset in the protected storage device, the last write to the offset that occurred before the indicated time. As described, metadata entries in journal 240 may include an offset in protected storage system 225 that may serve as an address of the related content entry of the write operation. Protection management unit 230 may scan all metadata entries in journal 240 and, for each offset, identify the last write to the offset before the indicated time.

For example, upon finding a first metadata entry related to a write to offset 0 that occurred before the indicated time, protected storage system 225 may record or mark the first metadata entry as the last write to the offset that occurred before the indicated time. If, continuing to examine metadata entries in journal 240, protection management unit 230 finds a second metadata entry related to a more recent write to offset 0 that also occurred before the indicated time, protected storage system 225 may record or mark the second entry as the last write to offset 0 that occurred before the indicated time. Accordingly, following a single pass over all metadata entries in metadata objects 241, protected storage system 225 may find the metadata entry related to the most recent or last write to offset 0 that occurred before an indicated time or date. In a similar way, protected storage system 225 may find, in a single pass over metadata in journal 240, the last write to each offset in a protected storage system that occurred before the indicated time. Accordingly, by traversing once the stream of metadata objects 241 in journal 240, a system and method according to embodiments of the invention may produce a list or structure that includes, for each offset or address in a protected storage system, the last write of data that took place before or up to a specified or indicated time or date.

As shown by block 530, a region-locator having a list of entries may be produced, each entry including an offset and a reference to a content entry in a content object, the content entry including data of the last write to the offset before the indicated time. For example, following a single pass over a set of metadata entries in metadata objects 241, the relevant metadata entries may be identified. As described, metadata entries may include a reference or pointer to the relevant content entries included in content objects 242. Accordingly, provided with metadata entries as described, protection management unit 230 may generate a region locator structure as described herein that may include, a list of offsets and for each offset in the list, a reference to the content entries containing the last content or data that was written to the offset before the specified or indicated time.

Additionally, the region-locator may be used to map or accumulate writes to content objects 251 in target disk 250. The region-locator may be used to determine, identify or locate, for each address space of a content object 251 all the writes to the corresponding address space in protected storage system 225 before the indicated time, as represented or included in journal 240. For example, following a single pass over a set of metadata entries in metadata objects 241, the relevant metadata entries of each address space of each content object 251 may be identified. For example, for a 16 MB content object that represents (or store content of) address space 0-16M, region-locator may be used to determine, identify or locate all writes to address space 0-16M in protected storage system 225 before the indicated time, as represented or included in journal 240. If a plurality of writes has been performed to the same offset within an address space, the last write before the indicated time will be selected.

As shown by block 540, the data structure may be used to produce a replication 260 of protected storage device 225 according to the indicated time. For example, if a user requests a replication of protected storage system 225 as it was five hours ago, then the region-locator as described herein may be generated such that it includes metadata entries related to the most recent writes to protected storage system 225 that occurred up to, but not later than, five hours ago. The region-locator may include indications to the most recent writes up to the indicated time to each address space corresponding to each content object 251.

According to embodiments of the present invention, a replication or image of the protected storage device according to the indicated time may be generated substantially without altering or updating the target disk. For example, the replication may be generated by using the entries in the region-locator for copying content from either target disk 250 or journal 240, as indicated in the region-locator, e.g., by copying data from content entries in the journal for the offsets in the list of the region locator, and copying data from the target disk for other offsets. For example, the image may be created as a single, possibly very large, object in the object storage, or elsewhere. For example, the image may be created on block storage where it may be mounted as an actual disk, e.g., Elastic Block Store (EBS®) in AMAZON®.

According to embodiments of the present invention, the replication or image may be generated by first updating target disk 250 and then copying the updated target disk 250. The content in the relevant content objects may be copied to target disk 250, using the entries in the region-locator, possibly updating content objects 251 no more than once, as described herein with relation to FIG. 4. An image of protected storage system 225 may then be created based on target disk 250. For example, a disk image may be created by copying data from target disk 250. The image may be created by copying the updated target disk into a single object in the object storage, or elsewhere. The updated disk may be copied to block storage where it may be mounted as an actual disk, e.g., Elastic Block Store (EBS®) in AMAZON®.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computer-implemented method of protecting data in a protected storage system, the method comprising:
   storing, in an object-based storage, a replication of the protected storage system from a predetermined time point before a time window, in a plurality of fixed-size replicated content objects of a target disk, wherein a replicated content object stores data of an address apace of the protected storage system, wherein a replicated content object can be re-written but cannot be modified;
   obtaining data stored on the protected storage system following changes in the protected storage system, and metadata related to the stored data;
   maintaining a journal comprising a plurality of fixed-size journal content objects stored in the object-based storage and a plurality of fixed-size metadata objects stored in the object-based storage, by:
   including a copy of the stored obtained data in a content entry in one or more of the journal content objects;
   including at least some of the metadata in a metadata entry in one or more of the metadata objects; and
   associating the metadata entry with the content entry; and
   periodically applying the data received before the predetermined time window from the journal content objects to at least one replicated content object by obtaining the at least one replicated content object, modifying the at least one replicated content object and re-writing the at least one replicated content object, wherein periodically applying the data comprises:
   examining metadata objects in the journal to identify entries related to last writes to offsets, that occurred before the time window;
   generating a region-locator, wherein the region-locator includes a list of the offsets and, for an offset in the list, a reference to a content entry in a journal content object that includes data of the last write to the offset;
   using the region-locator to copy content of all last writes to a respective address space from the content entries to the corresponding replicated content object; and
   removing the copied content entries from the journal.

2. The method of claim 1, comprising using the target disk and the journal to generate a replication of the protected storage system at a specified time.

3. The method of claim 2, comprising:
   receiving a time value;
   examining metadata objects in the journal to identify entries related to last writes to offsets, that occurred before the time value;
   generating a region-locator, wherein the region-locator includes a list of the offsets and, for an offset in the list, a reference to a content entry in a journal content object that includes data of the last write to the offset; and
   using the region-locator to produce the replication of data stored on the protected storage system by:
   copying data from content entries in the journal for the offsets in the list; and
   copying data from the target disk for other offsets.

4. The method of claim 2, wherein the replication is generated as a single object in the object storage.

5. The method of claim 1, wherein the metadata objects are kept in a chronologically ordered stream.

6. The method of claim 1, wherein a metadata object includes at least one of: an offset in the protected storage device, a size, a reference to a copy of data written to a storage device and a timestamp.

7. The method of claim 1, wherein the journal content objects and the metadata objects have fixed size and can be re-written but cannot be modified.

8. The method of claim 1, further comprising:
detecting changes in the protected storage system to capture the data stored on the protected storage system; and
recording the metadata related to the write operation.

9. The method of claim 8, wherein detecting changes in the protected storage system comprises intercepting the write operation to the protected storage system.

10. The method of claim 8, wherein detecting changes in the protected storage system comprises:
using a previous snapshot and a subsequent snapshot to identify changes made to a protected storage system.

11. A system for protecting data in a protected storage system, the system comprising:
a management unit configured to:
store, in an object-based storage, a replication of the protected storage system from a predetermined time point before a time window, in a plurality of fixed-size replicated content objects of a target disk, wherein a replicated content object stores data of an address apace of the protected storage system, wherein a replicated content object can be re-written but cannot be modified;
obtain data stored on the protected storage system following a write operation in the protected storage system, and metadata related to the stored data;
maintain a journal comprising a plurality of fixed-size journal content objects stored in the object-based storage and a plurality of fixed-size metadata objects stored in the object-based storage, by:
including a copy of the obtained data in a content entry in one or more of the journal content objects;
including at least some of the metadata in a metadata entry in one or more of the metadata; and
associating the metadata entry with the content entry; and
periodically apply the data received before a predetermined time window from the journal content objects to at least one replicated content objects by obtaining the at least one replicated content object, modifying the at least one replicated content object and re-writing the at least one replicated content object,
wherein the management unit is configured to periodically apply the data by:

examining metadata objects in the journal to identify entries related to last writes to offsets, that occurred before the time window;
generating a region-locator, wherein the region-locator includes a list of the offsets and, for an offset in the list, a reference to a content entry in a journal content object that includes data of the last write to the offset;
using the region-locator to copy content of all last writes to a respective address space from the content entries to the corresponding replicated content object; and
removing the copied content entries from the journal.

12. The system of claim 11, further comprising:
a change detection unit configured to capture the stored data and the metadata related to the write operation in the protected storage system.

13. The system of claim 11, wherein the management unit is further configured to:
use the target disk and the journal to generate a replication of the protected storage system at a specified time.

14. The system of claim 13, wherein the management unit is configured to generate a replication by:
receiving a time value;
examining metadata objects in the journal to identify entries related to last writes to offsets, that occurred before the time value;
generating a region-locator, wherein the region-locator includes a list of the offsets and, for an offset in the list, a reference to a content entry in a journal content object that includes data of the last write to the offset; and
using the region-locator to produce a replication of data stored on the protected storage system by:
copying data from content entries in the journal for the offsets in the list; and
copying data from the target disk for other offsets.

15. The system of claim 13, wherein the replication is generated as a single object in the object storage.

16. The system of claim 11, wherein the metadata objects are kept in a chronologically ordered stream.

17. The system of claim 11, wherein a metadata object includes at least one of: an offset in the protected storage device, a size, a reference to a copy of data written to a storage device and a timestamp.

18. The system of claim 11, wherein the journal content objects and the metadata objects have fixed size and can be re-written but cannot be modified.

19. The system of claim 11, wherein the protected system is one of: a physical disk, a virtual disk and a virtual machine.

* * * * *